Jan. 12, 1937.  E. SEIBOLD  2,067,793
HYDRAULIC VARIABLE SPEED TRANSMISSION AND METHOD FOR OPERATING THE SAME
Filed Oct. 7, 1933   4 Sheets-Sheet 1
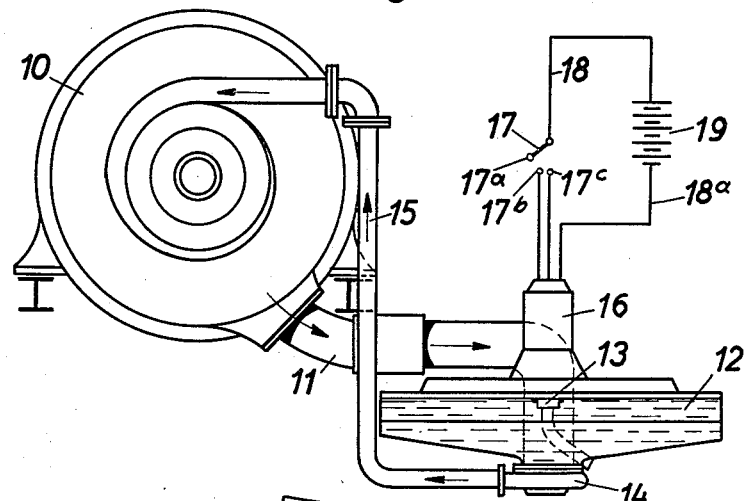
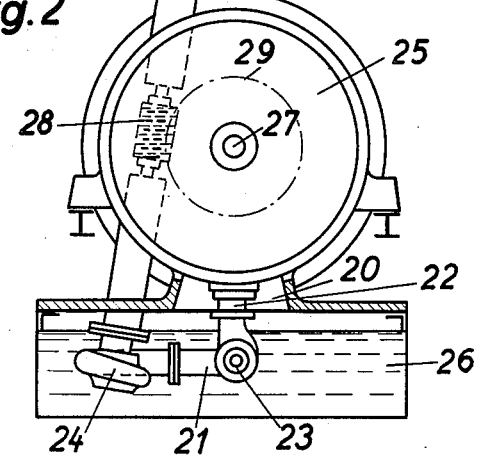
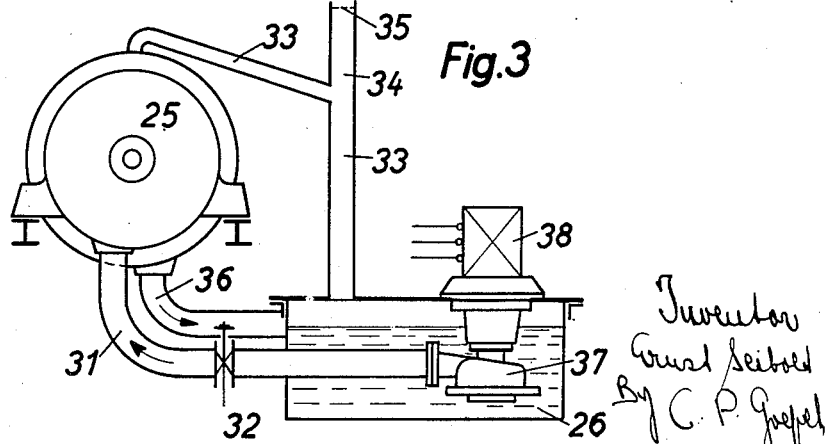

Jan. 12, 1937.  E. SEIBOLD  2,067,793
HYDRAULIC VARIABLE SPEED TRANSMISSION AND METHOD FOR OPERATING THE SAME
Filed Oct. 7, 1933  4 Sheets-Sheet 2

Inventor
Ernst Seibold
By C. P. Goepel
Attorney

Jan. 12, 1937.          E. SEIBOLD          2,067,793
HYDRAULIC VARIABLE SPEED TRANSMISSION AND METHOD FOR OPERATING THE SAME
Filed Oct. 7, 1933          4 Sheets-Sheet 3

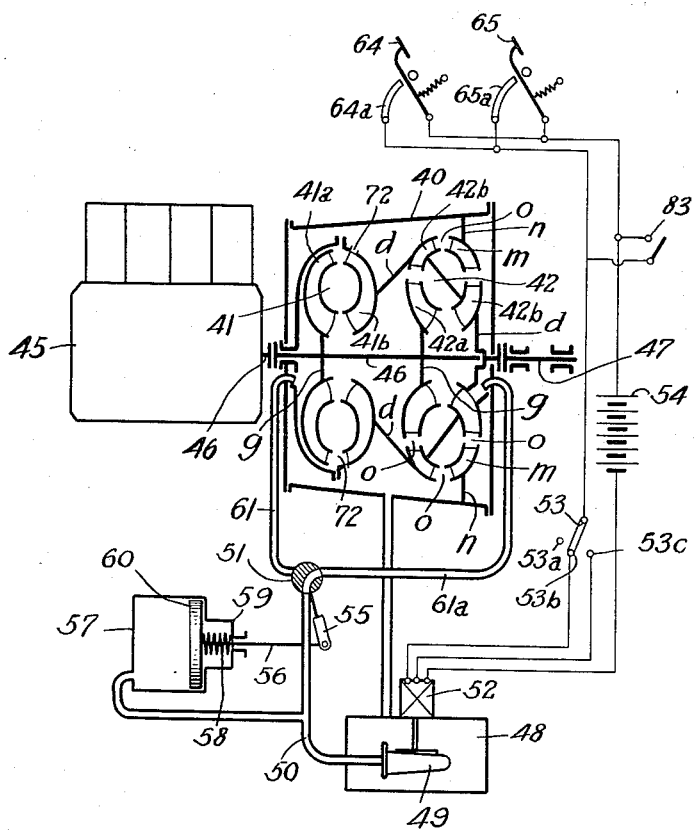

Patented Jan. 12, 1937

2,067,793

UNITED STATES PATENT OFFICE 2,067,793

HYDRAULIC VARIABLE SPEED TRANSMISSION AND METHOD FOR OPERATING THE SAME

Ernst Seibold, Heidenheim-on-the-Brenz, Germany, assignor to J. M. Voith, Heidenheim-on-the-Brenz, Germany, a co-partnership composed of Walther Voith, Hermann Voith, and Hans Voith Application October 7, 1933, Serial No. 692,664
In Germany October 11, 1932

15 Claims. (Cl. 60—54)

This invention relates to hydraulic variable speed transmissions and methods for operating the same, and more particularly to improvements in such transmissions as are generally known as the Foettinger type. Particular reference is hereby made to my copending application Serial No. 688,727, filed in the United States Patent Office on September 9, 1933.

The hydraulic variable speed transmission hereinafter referred to is one which comprises a self-contained hydraulic torque changer which may also be combined with a hydraulic slip coupling. The transmission is operated by emptying or filling its various parts.

This invention embodies such an hydraulic transmission, which is set in operation by filling it with liquid, and put out of operation by interrupting the liquid supply. This invention serves also to control the supply and distribution of the operating liquid. It may be mentioned here that heretofore in hydraulic transmissions which are set in operation by filling with liquid and put out of operation by the interruption of the liquid supply and discharge of the operating liquid through apertures (as for instance, clearances between various elements of the transmission), a return pump immediately carries the liquid to an elevated reservoir, out of which the transmission is supplied, as the demand requires with the aid of throttling elements. The return pump runs in such a case, continually with the same speed of revolutions. The transmission is then controlled by means of the adjustment of the throttling elements between the elevated reservoir and the transmission. In the case of remote controlled or automatic installations, these require special servomotor devices which increase the costs of installation and diminish the safety of operation. These objections are overcome by my present invention in which the reservoir for the discharged liquid is placed entirely below the transmission, that is, the overflow edge of the reservoir lies below the lowest point of the moving parts of the transmission, and the supply pump for the operating liquid is also placed below the reservoir. By this arrangement, it is possible, in the simplest manner, to put the transmission in operation by allowing the supply pump to operate, and to place the transmission out of operation by stopping the pump. This feature of the invention consists of an hydraulic variable speed transmission which has continuously open discharge apertures, which transmission is put in operation by supplying liquid thereto, and which is made inoperative by stopping the supply of liquid; and/or in which the overflow edge of the reservoir for the liquid lies deeper than the deepest point of the rotating parts of the transmission and/or in which the supply pump is placed at the lowest point of the reservoir. The invention also consists of the new step in the art in which the transmission is put in operation by the running or operation of the supply pump, and put out of operation by stopping said pump.

The second feature of the invention is to place the parts carrying the liquid, which are necessary for the operation of the hydraulic transmission, all into the reservoir, built as a unit with the transmission. Another embodiment thereof consists in driving the supply pump from the primary shaft of the transmission. Another object of this invention is to overcome certain disadvantages of former devices, and this is accomplished by uniting the various elements for the liquid supply and its control into a single casing. This arrangement brings about a great saving of space, prevents outward leakage, and thereby increases the safety of operation of the entire apparatus.

The third feature of the invention consists in providing means to make possible the equalization of pressure between the air spaces of the transmission and the reservoir, and to so place the air vent as to avoid the loss of liquid. In the operation of devices of this kind, it has been shown that the liquid which passes to the reservoir always absorbs or entrains air. By this intermingling with air, a strong transposition of air from the transmission to the reservoir may take place, whereby an injurious under-pressure in the transmission and a corresponding over-pressure in the reservoir may result. This is undesirable for many reasons, and it is unavoidable, for instance, in such transmissions in which connecting conduits between the reservoir and the different parts of the transmission exist, particularly in such cases where the conduits, for certain reasons, terminate below the liquid level in the reservoir. If then there is a lower pressure in the transmission and a higher pressure in the reservoir, by these pressures liquid is forced back into such parts of the transmission which are empty. Furthermore, such over-pressure in the reservoir makes difficult the flow of the returning liquid from the filled parts of the transmission which is equally undesirable and gives cause for disturbances. All of these objections can be avoided by providing a pressure equalizer between the air chambers of the transmission and the reservoir. The simplest embodiment provides an air connection between the highest places of the transmission and the reservoir, and such an arrangement has produced an unexpected decrease in the loss inherent in the apparatus. Also, liquid losses from the reservoir are avoided due to the fact that pressure increase in the reservoir is avoided. Tests which have been made have demonstrated surprisingly favorable results from this improvement. Preferably, the embodiment provides for the arrangement of the air connection at so high a position that liquid losses are avoided. Finally, when changing over from one part of the transmission to another part, it has been found that the discharge of air from the part to be filled with liquid and the inflow of air into the part to be emptied of the liquid, take place much more rapidly and more efficiently. To assist this operation, special air openings are provided for each part of the transmission, whereby an exceedingly rapid exchange of air between the transmission, the housing, and the casing, takes place.

The fourth feature of this invention embodies an hydraulic transmission in which the pump runs with a considerably smaller number of revolutions during the slip coupling operation than during the torque changer operation. It has been found that in the use of hydraulic transmissions, a considerably lower supply pump pressure is required to keep the slip coupling filled than is required to keep the torque changer filled with liquid. As the pump in all cases must be so designed that it can supply the necessary high pressure for the torque changer, it would work with high losses when the coupling operates. This high loss is of great importance, since the time of operation of the coupling constitutes by far the greater part of the total operating time of the transmission. If the pump is a centrifugal pump, and if it is driven mechanically independently of the power shaft, for example, by a small electric motor, then the condition of the operation can be fulfilled in accordance with the invention, without the objections named, thereby that in the operation of the slip coupling the supply pump is driven with an essentially smaller number of revolutions than is the case in the torque changer operation, and so generates the desired smaller pressure. The fact that by changing over from torque changer to the slip coupling operation, the pressure and the number of revolutions of the supply pump are reduced, can be utilized further in that this pressure difference may be used for the control of a multiple way valve, as the liquid passing from the pump to the transmission can be directed either to the slip coupling or to the torque changer. This is accomplished thereby that with the higher supply pump pressure the multiple way valve takes the torque changer position, and with the lower supply pressure pump, it takes the slip coupling position. During the change-over from slip-coupling position to torque changer position, by increasing the supply pump pressure, energy is stored, for instance, by compressing a spring of a servo-motor operating the multiple way valve, so that this energy is then utilized automatically to change the position of the valve as soon as the pump pressure is less than the force of the spring. The pressure of the supply pump depending on the number of revolutions or speed of its operating electric motor, then determines the position of the valve. When the higher speed is applied, the torque changer is filled, and when the lower speed is applied the slip coupling is filled.

Finally, another feature of this invention is that when the force of power flow from the motor to the driving wheels is stopped, the various parts of the transmission are emptied of operating liquid. In such devices it was the general desire heretofore to keep the transmission constantly filled and special leakage-proof means were provided to keep the leakage losses and return pipes and reservoir as small as possible. In the present invention, however, the opposite path is followed whereby important advantages are obtained. It has been the endeavor of the industry to provide for heavy and medium weight vehicles, a suitable free-wheeling, but heretofore this has not been successfully accomplished, as no one has as yet provided safely-operating, free-wheeling for larger capacities. The known constructions are very complicated, sensitive, and expensive and detrimentally influence the operation. All of the advantages of free-wheeling are obtained in a simpler manner by this invention without impairing the efficiency of the operation. The principal underlying feature of my invention is to so operate the transmission that it may be emptied when the power flow from the motor to the driving wheels is interrupted. It is no longer necessary that such transmission be leakage-proof, since it may have considerable leakage and a suitable outflow of the operating liquid may be provided in order that the transmission may be emptied rapidly. For the return of the leakage any pump will serve, the operation of which is so controlled that the above principle of operation may be carried out. For simplicity of understanding, it may be assumed that the supply pump is driven by an electric motor. Suitable provision is made to empty the transmission and allow the intended free-wheeling by switching off the control motor, the moment the power transmission from the engine to the driving wheels ceases. Such provision includes a device which makes the supply pump dependent upon the operation of the gas pedal, so that the pump in the no-load position of the gas lever does not return any liquid into the transmission. If it is again desired to transmit power to the driving wheels, by pressing down the gas pedal the supply pump motor is again switched in and the hydraulic transmission is filled thereby and power transmission is started or continues within the shortest possible time. A special advantage of such free-wheeling is that all the operating sequences follow each other without the slightest mechanical shock or annoyance, because there is no mechanical element utilized in any manner in the initiation and termination of the power transmission. It is, moreover, in many cases desired, especially in going down-hill, to use the engine as an auxiliary brake. A mechanical freewheeling requires for this purpose, a special return block device, which is a difficult, expensive, and sensitive element. In accordance with this invention, the mere filling of the hydraulic transmission will answer this requirement. One simply switches in the supply pump motor in a manner similar to the actuation of the return block device; and the present invention presents the advantage that for this purpose, very simple, inexpensive, and fully actuable elements are applicable. In view of the small amount of power required for the control, it is also possible without any difficulty to connect this switch with the brake pedal in such a manner that by the down pressure of the brake pedal, the auxiliary braking of the engine is set in operation, and at the same time this gives a very smooth starting to the braking operation.

These and further features of the invention will be hereinafter described, with the aid of the accompanying drawings; and the invention will be finally pointed out in the appended claims.

In the accompanying drawings:—

Figure 1 shows a side elevation of a hydraulic transmission in which the pump is at the lowest point of the liquid reservoir;

Figure 2 shows a side elevation partly in section, of another embodiment of my invention in which all of the essential operative parts are brought within a unitary container;

Figure 3 shows a side elevation partly in section in which the apparatus shown is provided with an air vent;

Figure 6:
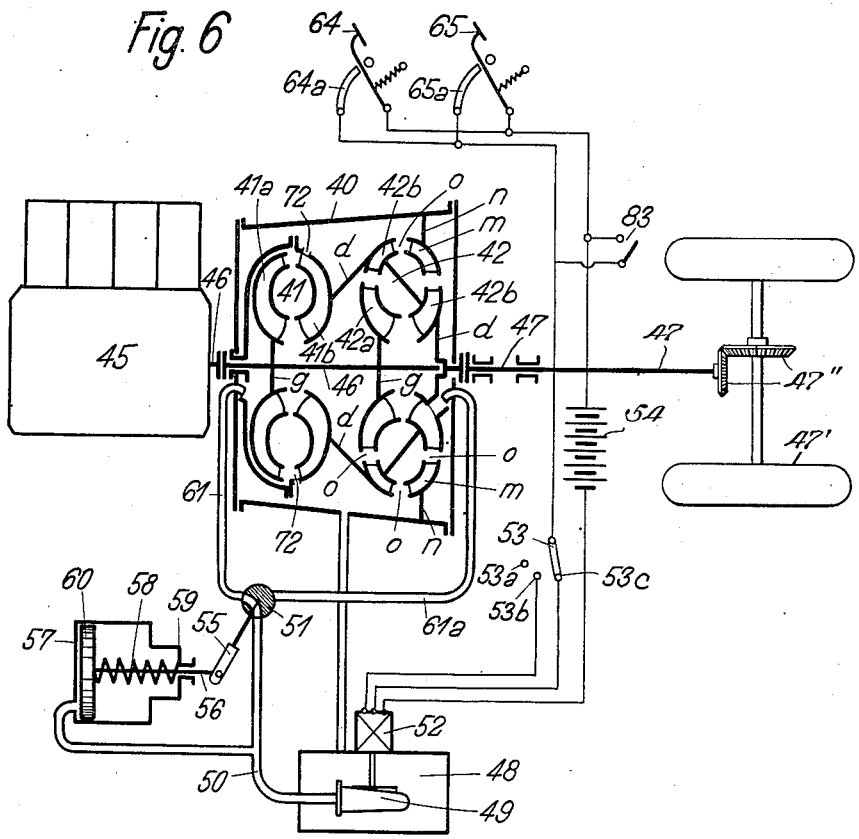

Figure 6 is a diagrammatic drawing of a hydraulic transmission adapted to be operated by a multiple way valve automatically controlled by the liquid pressure of the pump, whereby the supply pump runs at considerably less revolutions-per-minute when connected with the slip coupling than when connected with the torque changer; and shows diagrammatically a composite view of the various embodiments described.

Figure 7:
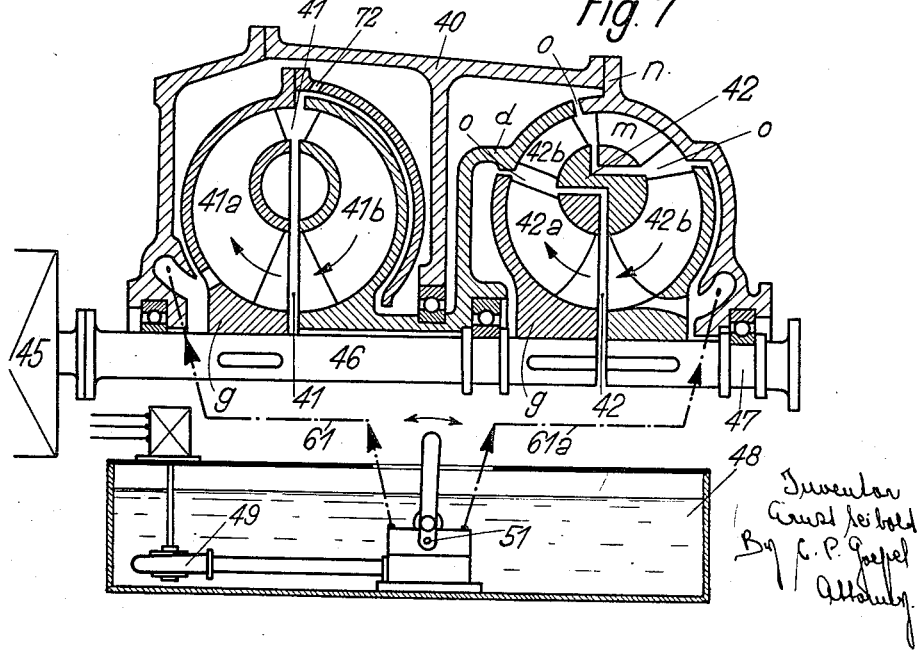

Figure 7 is an enlarged drawing of parts of Figure 6.

Figure 8 is a diagrammatic view similar to Figure 6 with the parts shown in position for supplying operating fluid to the torque changer.

Similar characters of reference indicate corresponding parts throughout the various views.

Referring to Figure 7, the hydraulic transmission is contained in the casing 40, in which the slip coupling 41 and the torque changer 42 are arranged. As is known, each one of these devices consists of the driving members and the driven members. The driving members are fixedly connected with the primary or driving shaft 46, and the driven members are fixedly connected with the driven shaft 47. The driving members are indicated by 41ª and 42ª, and the driven members are indicated by 41ᵇ and 42ᵇ. The driven members 41ᵇ and 42ᵇ are mechanically interconnected or coupled with the driven shaft 47, by elements d, and rotate therewith. A stationary guide wheel m of the torque changer is connected by elements n to the casing 40.

The driving members 41ª and 42ª are operatively connected by elements g to the driving shaft 46 and rotate therewith. When the engine 45 operates, the driving members 41ª and 42ª rotate with the shaft 46, while the driven members 41ᵇ and 42ᵇ and driven shaft 47 remain in rest as long as no liquid is present in the slip coupling and torque changer. As soon as operating liquid is admitted to one of these devices, either to the slip coupling 41 by means of pipe 61 or the torque changer 42 by means of pipe 61ª, then power is transmitted to the driven member of the respective devices through the action of the operating liquid, so that the driven member also revolves, and operates the driven shaft 47. If it is desired to change over from one device to the other, that is, for instance, from the torque changer to the slip coupling, the liquid supply is cut off from the torque changer and liquid is admitted to the slip coupling, by means of pipe 61. When the supply of liquid is cut off from the torque changer, the liquid in the torque changer dissipates, by passing out of the clearances o. The slip coupling 41 then assures the transmission of power, while the torque changer is idling. The same sequence of operation only in the reverse direction takes place, in the case of a change-over from the slip coupling operation to the torque changer. A controlled valve 51 distributes the liquid to either the slip coupling or the torque changer, which liquid is pumped by the pump 49, which in turn may be operated by any source of power, as for instance, electrical means, in which case switches 64, 65, 63 and 53 shown in Figure 6 are manipulated, as will be hereinafter described.

Referring now to Figure 1, the hydraulic transmission 10 is connected with the discharge conduit 11 which in turn is connected with the reservoir 12, the latter being provided with an overflow edge 13, and such edge 13 is lower than the lowest point of the operating parts of the transmission 10. At the lowest point of this reservoir 12, a supply pump 14 is provided and this pump is connected with the hydraulic transmission 10 by means of the conduit 15.

This arrangement is especially advantageous when operated in such a manner that during the starting period of the transmission the supply pump is driven with a higher number of revolutions than that necessary to keep the transmission filled when in normal operation. One obtains by this a short starting period. The necessary larger starting power of the supply pump is of no importance as it is required only for several seconds. In ordinary normal operation, the supply pump is required to run only with so small a number of revolutions as is necessary to maintain the transmission filled, and the power requirement in such a case is small. To obtain the above higher number of revolutions, in the simplest manner, the supply pump is driven by an electric motor 16 capable of running with at least two different speeds and the switch 17 for this motor is correspondingly provided with at least two operating positions. These positions are so arranged that from the zero position 17a the position of high-speed revolution 17b must first be passed through, and only by further movement of the switch to position 17c, is the lower motor speed provided for normal operation obtained. The electric circuit is completed by conductors 18 and 18a and electrical source of supply 19. Particularly important are the advantages of this arrangement in hydraulic transmission in which during the operation, the liquid is allowed to dissipate from one part of the transmission, whereby the same is emptied, and is supplied to another part of the transmission for the purpose of filling it. In such a case, one uses, on the pressure side of the supply pump, a multiple way valve, which connects piping either with the slip coupling or the torque changer parts of the transmission.

In the embodiment shown in Figure 2, the transmission, the control valve and the supply pump are all assembled in the form of one unitary self-contained unit wherein the reservoir for the liquid is made of a very simple and inexpensive vessel and is screwed onto the transmission in such a way that the pump, the control valve and all connections are enclosed by the reservoir container. In this embodiment shown in Figure 2, the conducting parts 20, 21, and 22, the control valve 23, and the pump 24, are brought together in a unitary manner within the reservoir 26. The pump 24 is actuated by shaft 27 of the transmission by means of the worm 28 and the worm gear 29. Thus by the operation of shaft 27, and the rotation of the worm gear 29, the worm 28 and the shaft 30 are driven, whereby the pump 24 is operated, and the liquid forced through the conduits 20, 21 and 22 suitably controlled by the valve 23. It will be noted that all of these operating parts are within the reservoir 26 and that the parts are of the simplest construction. It will also be noted that the connections of the various conduits 20, 21 and 22 are within the liquid of the reservoir 26 so that no harm results from any leakage.

In the embodiment of Figure 3, a conduit 31 conducts operating liquid from the control valve 32 to the transmission 25. The air spaces of the transmission 25 and of the reservoir 26 are interconnected by an air pipe 33, which through a branch pipe 34 communicates with the atmosphere at its upper end 35, this end 35 being relatively high in respect to the other parts of the apparatus in order to avoid liquid losses. The liquid is returned from the transmission to the reservoir by pipe 36. The supply pump 37 is operated by the motor 38.

Figure 4:
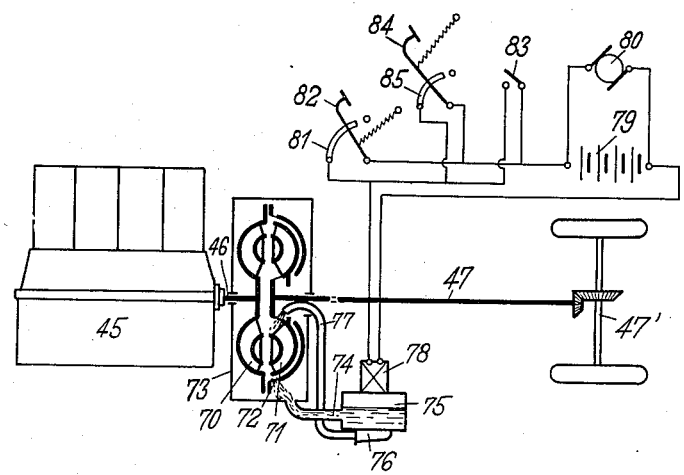
Figure 4 is a diagrammatic drawing of the parts arranged in such a manner as to permit the transmission to be completely discharged of liquid after the power of the engine has been cut off.

In the embodiment shown in Figure 4, the engine 45 drives the shaft 47, by means of the hydraulic transmission. The engine 45 drives the primary part 70 of the hydraulic transmission. The secondary part of this transmission indicated by 71, is secured to the shaft 47 by suitable mechanical means which are not shown and this secondary part 71 is connected through the shaft 47 with suitable driving wheels, 47'.

The hydraulic transmission has on its exterior, discharge apertures 72 out of which, during the filling operation, liquid constantly flows off into the casing 73 and from this casing flow, by means of conduits 74, into the reservoir 75. Connected with the reservoir 75, is a control pump 76 which again forces or supplies the actuating liquid into the transmission by means of the pipe 77. The transmission as disclosed in Figure 4 only consists of a slip coupling. It is clear that a transmission such as that shown in Figure 4, may be used, or one in which the slip coupling cooperates with a plurality of torque changers. The pump 76 is operated by means of a very small electric motor 78, which receives its current from a battery 79 of a lighting machine 80. The automatic switch 81 is connected with the gas pedal 82 so that the current flow to the motor 78 is interrupted by the inoperative position of the gas pedal, but in every other position is closed. Parallel with switch 81 are arranged a separate control switch 83, and a switch 85 operated by braking pedal 84. With the described arrangement, the operation will take place in the following manner:—

One operates the engine 45 without in any manner moving the gas pedal 82. The engine motor runs at its no-load speed and is not operatively connected with the shaft 47, since the pump 76 stands still, and the hydraulic slip coupling consisting of the primary and secondary wheels 70 and 71, is empty. If it is desired to start, the gas pedal 82 is pressed down. Thereby the switch 81 is closed and the electric motor 78 and the pump 76 are set in operation, filling the hydraulic slip coupling with operating liquid, and the power transmission of the automobile engine to the driving wheels 47' then takes place. After the automobile has been sufficiently accelerated and is running in a downward grade, or if it is desired for any other reason to slowly reduce the velocity, the gas supply is reduced, that is, the gas pedal 82 is raised. When it reaches its upper-end position or no-load position the switch 81 is opened, the electric motor 78 and the pump 76 stop, and the slip coupling is put out of operation due to the fact that the operating liquid is discharged from the parts 70 and 71 in a very short time through the discharge openings 72. Free-wheeling action is thereby obtained. The reverse action takes place as soon as the gas pedal is pressed down again, feeding more gas to and speeding up the engine. When it is desired to use the engine as an auxiliary brake, either the switch 83 is closed or the braking pedal 84 is pressed downwardly a short distance. Thereby the supply pump motor 78 is again operated and the hydraulic transmission is again filled with liquid. When the switch 83 is opened and/or when the brake 84 is released, free-wheeling again takes place until the gas pedal is again pressed downwardly. One recognizes here that with the described arrangement according to the foregoing method, the simplest and surest means for a smooth and agreeable free-wheeling is obtained and considerable savings in fuel consumption are realized, while the structural parts necessary to obtain this improvement are very inexpensive.

In the embodiment of Figure 6, the hydraulic transmission 40 consists of a hydraulic slip coupling 41 and a hydraulic torque changer 42. The transmission is driven by an engine 45 driving the shaft 46. The driven shaft 47 is operated by the transmission and actuates the driving wheels 47' through the gearing 47''. The operating liquid when at rest is stored in the reservoir 48 from where it is conducted by means of the supply pump 49 through a conduit 50 and multiple way valve 51 to the transmission 40. The pump 49 is driven by an electric motor 52, the current of which is controlled by a switch 53 having a zero terminal 53ᵃ, a high-speed terminal 53ᵇ, and a low-speed terminal 53ᶜ, and this electric circuit is supplied with current from any suitable source as, for instance, that indicated by the numeral 54. The multiple way valve 51 is operated by means of a lever 55 which, at one end, is connected with a piston rod 56 of a servomotor 57. A spring 58 is interposed between the casing 59 and the piston 60. The valve 51 is shown in Figure 6 as connecting the conduit 50 and the conduit 61, whereby the operating liquid is forced by the pump 49 into the slip coupling 41. The lever 55 of the valve 51 is held in this position by the spring 58, which forces the piston 60 to the left against the liquid pressure produced by the pump, which in this case is low. If the pressure produced by the supply pump is high, due to increased speed, the piston 60 is forced to the right, against the spring tension, and the lever 55 is moved to throw the way of the valve 51 to connect the conduit 50 with conduit 61ᵃ, and disconnect conduit 61. Thereby the liquid is forced into the torque changer 42. The operation just above described is shown by Figure 8. The described arrangement operates in its application to automobiles in the following manner:—At the standstill of the automobile, the entire transmission is emptied of its liquid. The reservoir 48 is filled, and the supply pump pipe 50 is pressureless, so that the servomotor piston 60 is pressed entirely to the left by the spring 58, whereby there is a free passage through the valve 51 for the liquid from the pump 49 to the slip coupling 41. If it is desired to set the automobile in operation, the switch 53 is set so as to cause the pump 49 running at high speed to develop high pressure in the conduit 50. Thereby the piston 60 is pressed toward the right and the multiple way valve 51 is so turned that the liquid passes through its channel to the torque changer 42, the torque changer 42 thereby is filled, developing a torque necessary to start and accelerate the automobile. When it is desired to change over to the slip coupling operation, the switch 53 is set for the lower speed of the pump motor 52. Thereby pressure in the conduit 50 is decreased, the spring 58 presses the piston 60 to the left and the channel of the valve 51 is placed in alignment with the conduits 50 and 61 leading to the slip coupling 41. The described arrangement may be advantageously installed in automotive vehicles and adapted to the well-known control devices of such vehicles in a very simple manner. This may be carried out by so arranging the switch 53 in a circuit with the gas pedal switch 64ᵃ and the braking pedal switch 65ᵃ. When both pedals 64 and 65 are in their upper-end positions the current is interrupted. For the purpose of putting the automobile in operation, once its engine is running and the switch 53 is in contact with terminal 53ᵇ, the torque changer 42 may be readily operated simply by pressing down the gas pedal 64. In a similar simple manner, the operation of the automobile takes place when going down-hill, since by releasing the gas pedal, the pump 49 will come to a standstill and the slip coupling 41 will run empty, whereby an automatic free-wheeling operation takes place. However, when it is desired to brake by means of the downward pressure upon the braking pedal 65, the current will be again switched on in which case the switch 53 can be in either position 53ᵇ or 53ᶜ, whereupon the pump 49 will fill either the slip coupling 41 or the torque changer 42, and the engine will then be operative as an auxiliary brake. Hence, depending upon the position of the switch 53, either the slip coupling 41, or the torque changer 42, is used as a brake.

Figure 5:
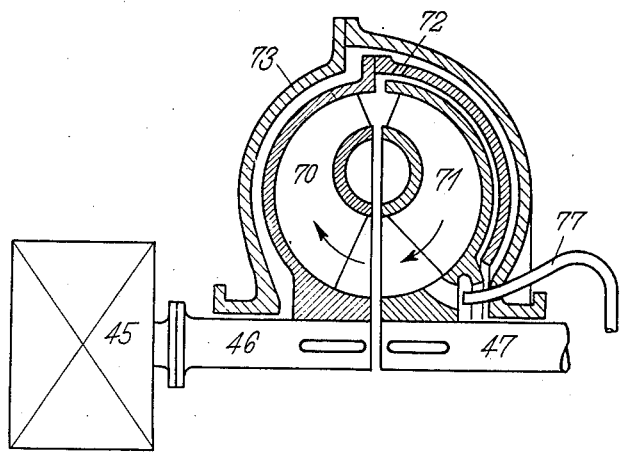
Figure 5 is an enlarged drawing of parts of Fig. 4.

My invention may be used in connection with a hydraulic slip coupling as shown in Fig. 5. The structure shown in Fig. 7, has at its left hand side, a hydraulic slip coupling and at its right hand side a torque changer. The invention described herein finds its embodiment, first, in such a hydraulic slip coupling, secondly, in such a torque changer, and thirdly in the combination of a hydraulic slip coupling and a torque changer. As heretofore stated, one or more torque changers can be used.

The invention also comprises the novel methods hereinbefore described.

I have described several embodiments of my invention, but changes may be made therein without departing from the spirit or scope of the invention as defined in the appended claims.

I claim:—

1. In a hydraulic variable speed transmission with continuously open discharge apertures, having a primary shaft, a reservoir placed lower than the lowest point of the rotating parts of the transmission, a supply pump placed at the lowest point of the reservoir, said transmission being put in operation by operating the supply pump, and put out of operation by the stopping of the same, said operation of the supply pump and non-operation of the same taking place during the rotation of the primary shaft and means for the starting operation and the stopping of the pump, the stopping of the pump being independent of the primary shaft.

2. In a hydraulic variable speed transmission having a slip coupling and a torque changer, a supply pump for supplying operating liquid to the transmission, a motor for the same having more than one speed, the higher one of said speeds being adapted to effect the operation of the pump to fill the transmission with operating liquid having a flow velocity of the liquid corresponding to such higher speed, and means for normally operating the motor at the other speed and operative only after first operating the motor and pump at the higher speed, whereby the filling time of the transmission is decreased to obtain a quick start.

3. In a hydraulic variable speed transmission having a casing, a slip coupling and a torque changer in said casing, a pump for forcing the operating liquid to either the slip coupling or to the torque changer, and a multiple way valve for guiding the liquid from the pump to either the slip coupling or to the torque changer a reservoir, supply pipe leading from the reservoir to the multiple way valve and a separate pipe from the casing for discharging the liquid to the reservoir.

4. In a hydraulic variable speed transmission, consisting of a slip coupling and a torque changer, a pump for forcing the operating liquid to either the slip coupling or to the torque changer, a multiple way valve for guiding the liquid to either the slip coupling or to the torque changer, and a servomotor for operating the valve, a supply pipe for the servomotor connected directly to the supply pipe of the multiple way valve.

5. In a hydraulic variable speed transmission consisting of two or more liquid circuits of which one may be a slip coupling and the other a torque changer, a supply pump, a multiple way valve, a control switch for the pump, means operating the multiple way valve depending upon the position of the control switch, and means operating the supply pump at an increased speed during the filling period of the liquid circuit when starting or when changing from one circuit to another.

6. In a hydraulic variable speed transmission, consisting of a hydraulic slip coupling and a hydraulic torque changer which apparatus is made operative by a supply of liquid filling the same and made inoperative by the shutting off of the supply of liquid, a supply pump having two speeds of operation, means actuating the pump at its lower speed when connected with the slip coupling, and means actuating the pump at its higher speed when connected with the torque changer.

7. In a hydraulic variable speed transmission having a slip coupling and a torque changer adapted to be put into operation by filling the slip coupling or torque changer with liquid and put out of operation by emptying the slip coupling or torque changer of liquid, a supply pump, a multiple way valve, means connecting the same with the pump and with the slip coupling and torque changer, and means interposed in said connecting means operating the multiple way valve by the higher pressure necessary for the operation of the pump when operating the torque changer.

8. In a hydraulic variable speed transmission consisting of a slip coupling and a torque changer, adapted to be put in operation by filling the same with liquid and put out of operation by emptying the same of liquid, a supply pump, a multiple way valve, means storing energy during the switching of the multiple way valve from slip coupling position to torque changer position, and means utilizing said energy for the reverse movement from torque changer operation to slip coupling operation, effected by the reduction of the speed of the supply pump, which in turn decreases the liquid pressure, whereby the position of the multiple way valve from the torque changer position to the slip coupling position, is changed.

9. In a hydraulic variable speed transmission, a coupling, a pump for forcing liquid into the coupling, a motor for the pump, a speed switch for operating the motor at different speeds for operating the pump at different speeds, electrical connections connecting the motor of the pump, switch, and source of supply, a gas pedal switch in said electrical circuit, a braking pedal switch in said electrical circuit, and electrical means connecting the gas pedal and braking pedal switches with the motor of the pump, for operating the motor and the pump by closing either the gas pedal switch or the braking pedal switch to operate the coupling.

10. In a hydraulic variable speed transmission for motor vehicles, a slip coupling and a torque changer, a pump for optionally forcing liquid into either the slip coupling or the torque changer, a motor for the pump, an electric circuit connected with the motor, a gas pedal switch in said electric circuit and associated with the vehicle, a brake pedal switch in said electric circuit and associated with the vehicle, and a third switch for said electric circuit for cutting out the motor and switching in the motor independently of the brake pedal switch and the gas pedal switch, said pump motor being adapted to be operated by either of the gas pedal switch or brake pedal switch or third switch independently of each other.

11. In a hydraulic variable speed transmission, a coupling, a torque changer, a pump for forcing liquid into the coupling or the torque changer, a motor for the pump, a speed switch for operating the motor at different speeds for operating the pump at different speeds, electrical connections connecting the motor of the pump, speed switch and a source of supply, a gas pedal switch in said last named electrical circuit, a braking pedal switch in said electrical circuit, and a fourth switch in said electrical circuit, said fourth switch being adapted to be closed to close the circuit when the gas pedal switch and brake pedal switch are open, said fourth switch being open when it is desired to operate either the gas pedal switch or the brake pedal switch, and the speed switch being adapted to operate the motor which operates the pump at different speeds whether the fourth switch is closed or whether either the gas pedal switch or the brake pedal switch closes the circuit.

12. A hydraulic transmission for automotive vehicles comprising a prime mover, a primary shaft, a secondary shaft, a primary wheel, a secondary wheel, said primary and secondary wheels being interposed between the primary and secondary shafts, a supply pump for supplying working fluid between the primary and secondary wheels, a motor for the supply pump, an electric circuit for the motor, operable independent of the prime mover, means for energizing the independent electric circuit, for operating the motor and means for stopping the motor and the pump, the stopping of the pump operating independent of the primary shaft and when the pump has stopped interrupting the supply of the working fluid between the primary and secondary wheels, whereby the pump alone controls the supply of such working fluid.

13. In an hydraulic variable speed transmission adapted for automotive vehicles having an engine and driving wheels, said transmission including primary and secondary wheels and an interposed fluid, which is adapted to be put into operation by filling the same with the fluid and put out of operation by emptying the same of the fluid, the combination of means for controlling the operation of the engine, means for controlling the filling and emptying the transmission of the fluid, and means connecting the engine, the transmission, and the driving wheels, whereby the control means of the engine upon effecting discontinuance of the transmission of power from the engine to the driving wheels, causes the control means of the transmission to empty the same, independently of the rotation of the engine.

14. In an hydraulic variable speed transmission adapted for automotive vehicles having an engine and driving wheels, said transmission including primary and secondary wheels and an interposed fluid, which transmission is adapted to be put into operation by the filling of the same with the fluid and to be put out of operation by emptying the same of the fluid, the combination of means for controlling the operation of the engine, means for controlling the filling and emptying the transmission of the fluid, means connecting the engine, the transmission, and driving wheels, independent means for filling with fluid the space between the primary and secondary wheels independently of the operation of the aforesaid two control means, and means to operate said independent filling means, whereby after the control means of the engine has effected the discontinuance of the transmission of power from the engine to the driving wheels and after the control means of the transmission has operated to empty the transmission to enable free wheeling to take place, the independent filling means may be operated to fill the transmission with the fluid while the engine is idling, to effect a reverse flow of power from the driving wheels to the engine and brake the vehicle through the medium of the engine.

15. In an hydraulic variable speed transmission for vehicles, which transmission has continuously open discharge apertures, a primary shaft with primary wheels thereon, a secondary shaft with secondary wheels thereon, a pump for supplying the operating liquid to the space formed between each pair of primary and secondary wheels, for effecting the transmission of power from the primary to the secondary shaft by filling the space between the primary and secondary wheels on the starting of the pump and maintaining such filling during the continued operation of the pump, whereby operation or non-operation of the pump alone determines the operation of the transmission independent of the primary shaft, and means for operating the pump including both the starting and stopping of the same, said stopping of the pump being independent of the primary shaft, and interrupting the transmission of power from the primary shaft to the secondary shaft by interrupting the flow of the operating liquid filling the space between the primary and secondary wheels.

ERNST SEIBOLD.